United States Patent [19]
Soohoo

[11] Patent Number: 5,640,311
[45] Date of Patent: *Jun. 17, 1997

[54] MINIATURIZED HIGH FREQUENCY DIRECT CURRENT POWER SUPPLY

[76] Inventor: Ronald F. Soohoo, 568 Reed Dr., Davis, Calif. 95616

[*] Notice: The term of this patent shall not extend beyond the expiration date of Pat. No. 5,621,624.

[21] Appl. No.: 518,430

[22] Filed: Aug. 23, 1995

Related U.S. Application Data

[63] Continuation-in-part of Ser. No. 298,002, Aug. 30, 1994.
[51] Int. Cl.$^6$ .................................................. H02M 3/335
[52] U.S. Cl. ................................ 363/21; 363/8; 363/86
[58] Field of Search ................................ 323/266; 363/8, 363/21, 124, 126, 127, 86

[56] References Cited

U.S. PATENT DOCUMENTS

| | | |
|---|---|---|
| 3,614,554 | 10/1971 | Richardson et al. . |
| 4,519,024 | 5/1985 | Federico et al. .......................... 363/127 |
| 5,355,301 | 10/1994 | Saito et al. .............................. 363/21 X |

OTHER PUBLICATIONS

Soohoo, R., "Magnetic Thin Film Inductors for Integrated Circuit Applications" IEEE Transactions on Magnetics, 15:1803–1805, 1979.

*Primary Examiner*—Peter S. Wong
*Assistant Examiner*—Y. J. Han
*Attorney, Agent, or Firm*—Townsend and Townsend and Crew LLP

[57] ABSTRACT

A power supply is disclosed which is compatible with modern thin film technology which has an overall size compatible with modern miniaturized electronic components. Input power having an oscillating component in the 50/60 Hz 120/220 volt range is immediately switched to high frequency current exceeding 100 KHz and preferably switched with a frequency in the megahertz range. The switched current, otherwise unaltered from its current having an oscillating component, is then transduced in voltage at a thin film transformer, passed through thin film mounted electronic components for rectification and filtering. A regulator circuit modifies the semi-conductor switch duty cycle to control the rectifier output voltage. All transformer, rectifier, and filter components are of thin film variety and mounted to attain efficient heat dissipation together with size reduction comparable to the powered components driven by the power supply.

3 Claims, 2 Drawing Sheets

MINIATURIZED HIGH FREQUENCY DIRECT CURRENT POWER SUPPLY

This application is a Continuation-In-Part of U.S. patent application Ser. No. 08/298,002 filed Aug. 30, 1994 entitled Miniaturized High Frequency Direct Current Power Supply. This application contains added materials relating to discoveries from actual experimentation with the above invention.

This invention relates to the miniaturization of power supplies for producing direct current. More particularly, a power supply is disclosed in which incoming current having an oscillating component in the range of 50/60 Hz is immediately converted to high frequency switched current in the megahertz range and thereafter rectified utilizing electronic components of the thin film variety. This approach drastically reduces the size of a power supply to a point whereby it can be in the form of a plug-in, a card, or an IC chip for use in a computer, cellular telephone, and telecommunication industries.

BACKGROUND OF THE INVENTION

Electronic components continue to be reduced in size. Unfortunately, direct current power supplies for such electronic components have not undergone such size reductions. Specifically, it is now common for small portable electronic components such as portable computers to have accompanying power supplies that are substantial in size and weight comparable to the portable computers themselves.

Conventional power supplies that rectify 50/60 Hertz 120/220 volt alternating current into direct current are particularly large. Such devices usually include full wave or half wave rectifiers which produce direct current still having the "ripple" of the originating alternating current. Thereafter, this ripple in the rectified current is substantially eliminated by appropriate electronic circuitry, such as a capacitance and inductance, to produce the required stable direct current.

Unfortunately, such conventional power supplies involved low frequencies and long wave lengths. These low frequencies and long wave lengths lead to high power losses. Almost everyone using such devices is familiar with the "warm" feeling that such large rectification devices have after continued use. Further, such components have large size. They either occupy a substantial volume of the devices which they power or alternatively constitute large stand alone components which reside outside of the units which they power.

In an effort to further reduce size, so-called switched mode power supplies have been utilized. These devices include a low frequency rectifier and relatively crude filter. The total power from this low frequency rectifier and filter is then routed to a semiconductor switch. With the semiconductor switch, the rectified power is then converted to high frequency switched power which is thereafter rectified.

These switched power supplies generally operate with their switching transistors operating in the kilohertz range— typically below 40 KHz. While the ultimate rectification that they can produce is superior, and the rectifying components of such power supplies are somewhat smaller, they frequently are not equivalent in size to the components that they serve. For example, the average "notebook computers" single largest component is the power supply. It is almost always, external to the remainder of the computer and rather bulky relative to that computer.

SUMMARY OF THE INVENTION

A power supply is disclosed which is compatible with modern thin film technology which has an overall size compatible with modern miniaturized electronic components. Input power having an oscillating component in the 50/60 Hz 120/220 volt range is immediately switched to high frequency current exceeding 100 KHz and preferably switched with a frequency in the megahertz range. The switched current, otherwise unaltered from its current having an oscillating component, is then transduced in voltage at a thin film transformer, passed through thin film mounted electronic components for rectification and filtering. A regulator circuit modifies the semi-conductor switch duty cycle to control the rectifier output voltage. All transformer, rectifier, and filter components are of thin film variety and mounted to attain efficient heat dissipation together with size reduction comparable to the powered components driven by the power supply.

It is to be noted that over the prior art, several distinctions are present.

First, by feeding the 110/220 volt, 60 Hertz supply directly to a semiconductor switch section, the bulky low frequency rectifier/filter section of prior art power supplies is eliminated.

Second, by going to the megahertz range of semiconductor switching directly—and omitting the initial crude rectification stage common to most switching power supplies—the high frequency supply is reduced to "card compatible size" as small as a single I.C. chip. For the first time, power supplies have a size that is compatible with the components which they serve.

Third, thin film technology can be used for transformer, rectification and filtering components of the invention. As a result, required heat dissipation of the smaller rectification device is easily accommodated.

New Material

As a direct result of experimentation with the circuitry here described, it has been discovered that the high frequency semiconductor switch when powered directly from the power line, effectively does away with the 60 Hertz frequency component. Furthermore, an embodiment of the circuit is disclosed which does not include the thin film transformer and utilizes a regular inductor. Over conventional power supplies, substantial size reduction still results. While the previously disclosed embodiment including the thin film transformer and the thin film inductor remains preferred, the disclosure of the new embodiment (FIG. 4) has been found to be operable and to have utility.

DESCRIPTION OF THE PREFERRED EMBODIMENT

Figure 1:
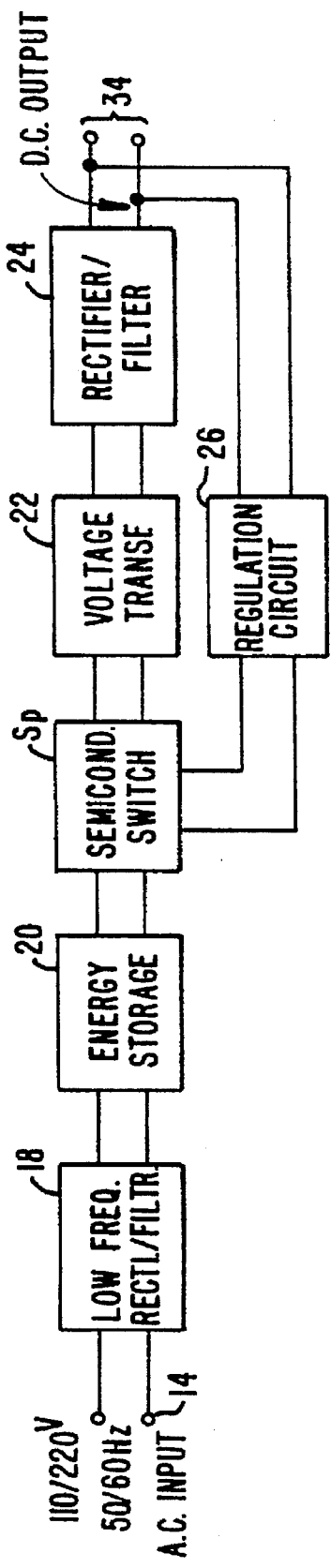
FIG. 1 is a block diagram of a prior art conventional switched mode power supply having an initial crude rectification followed by a semiconductor switch, transformer, and rectifier/filter.

Referring to FIG. 1, a conventional switched power supply of the prior art is illustrated. A.C. input 14 provides power to be rectified. This current then passes through low frequency rectifier/filter 18 and then to energy storage device 20. In the conventional switched power supply of the prior art, switching at semi-conductor switch $S_p$ is then provided, usually in a range below 40 KHz. Voltage is conventionally transduced at transformer 22 to the desired voltage for conventional rectifier 24. Rectified current leaves power supply output 34. As is common, the duty cycle of semi-conductor switch $S_p$ is controlled through regulator circuit 26 which continually monitors the switched power supplies output.

In the switched power supply, it will be observed that an attempt is first made to rectify the current when the current is still in the 50/60 Hz range. This initial rectification requires large components because of long wave lengths. In what follows, I take the step of immediately switching to high frequency—above 100 KHz and preferably in the MHz range. This immediate switching to higher frequencies is believed to be in the opposite direction of conventional power supplies. However, the high frequency produced makes the remainder of the processing possible utilizing miniaturized components.

Figure 2:
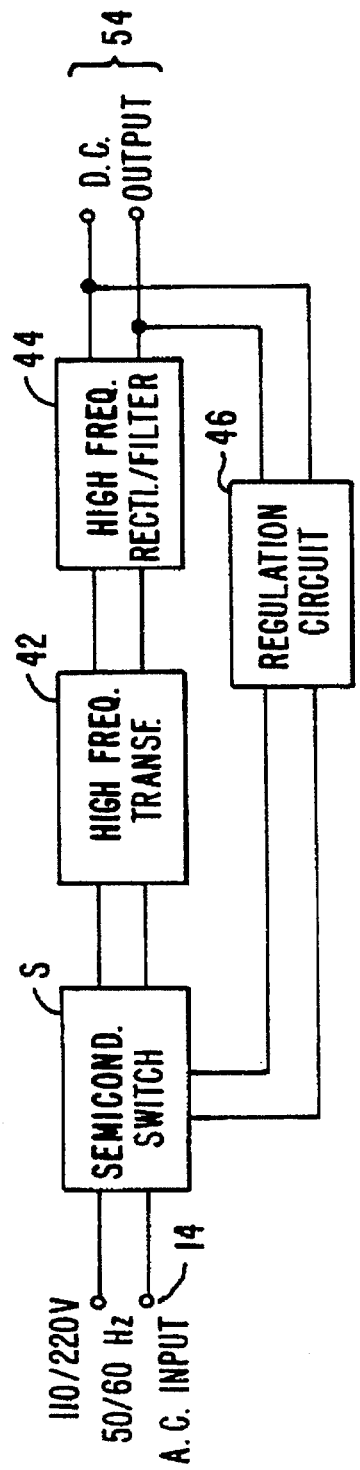
FIG. 2 is a block diagram of the improved power supply of this invention having the semiconductor switch directly switch the incoming power to the megahertz range followed by thin film transformer, rectifier/filter circuit monitored by a thin film regulator circuit with duty cycle control of the semiconductor switch.

Referring to FIG. 2, a diagram of the invention herein is set forth. A.C. input 14 includes current having a substantial 50/60 Hz oscillating component. While it is not necessary that the rectified current of this invention have true alternating current format, the invention is designed for the power supply to be powered utilizing current having 50/60 Hz oscillating component or harmonics of this frequencies.

Upon entry into the power supply, immediate switching at semi-conductor switch S occurs. Such switching takes the current to a switched frequency exceeding 100 KHz and preferably to the MHz range. Thereafter, current flow includes high frequency voltage transformer 42 and high frequency voltage rectifier/filter 44. As will hereafter be developed, these circuits because of the high frequencies involved can be quite small. Thereafter, power supply output 54 provides current while high frequency regulator 46 controls voltage output by controlling semi-conductor switch S duty cycle.

Figure 3:
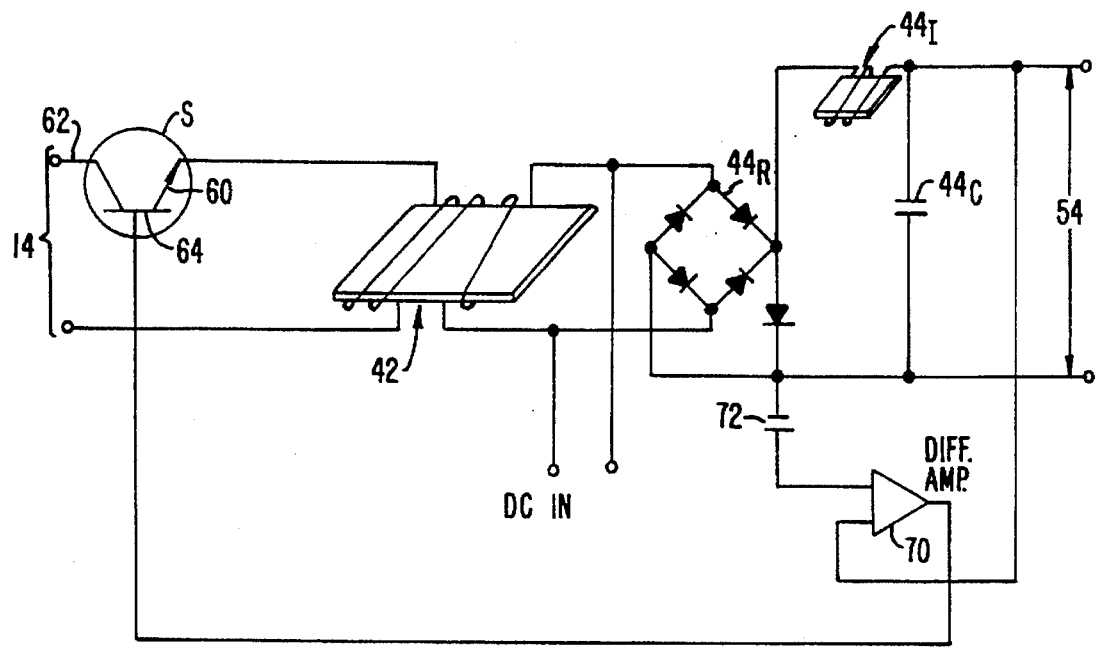
FIG. 3 is a schematic of a exemplary regulator circuit suitable for the high frequency power supply of this invention.

Referring to FIG. 3, semi-conductor switch S is shown with sink 62, gate 64, and source 60. As can be understood, duty cycle at gate 64 is modified through a regulator circuit including differential amplifier 70 and reference voltage 72, both of which can be thin film mounted because of the high frequencies involved.

High frequency voltage transformer 42 is schematically shown and is of the thin film variety. Such devices are described and set forth in *Magnetic Thin Film Inductor for Integrated Circuit Applications* by myself in IEEE Transactions on Magnetics, Vol. Mag. 15, No. 6, Nov. 1979 at pages 1803–1805.

Once voltage is transduced, it then passes to high frequency rectifier $44_R$ and thereafter to high frequency inductor $44_I$, and high frequency capacitor $44_C$ all of which are thin film mounted.

A word can be added about that power required to drive semi-conductor switch S. Specifically, semi-conductor switch S is only given sufficient power to drive the switching function. Unlike switches of the prior art, input of low frequency rectified current is not utilized to drive the switching circuit. I generally prefer feed back rectified power from output 54 to drive semi-conductor switch S. Alternately, sufficient current to start switching can be provided from either a small direct current source such as battery or alternatively from a low level rectifier having sufficient current to power switching only.

Regarding the utility of this invention, some comparisons may be useful. In the following table, I give the relative power supply sizes of the prior art of FIG. 1 compared to the preferred embodiment of FIG. 3.

TABLE I

Power Supply Size Comparisons

| Component Type | Typical or Estimated Volume (in Cubic Inches) |
|---|---|
| P.C. Computer Power Supply | 215 |
| Notebook Computer Power Supply | 37 |
| Plugin Power Supply* | 12 |
| Card Power Supply* | 6 |
| I.C. Power Supply* | 0.3 |

*Underlying this invention.

New Material

As a direct result of experimentation with the circuitry here described, it has been discovered that the high frequency semiconductor switch when powered directly from the power line, effectively does away with the 60 Hertz frequency component. Furthermore, an embodiment of the circuit is disclosed which does not include the thin film transformer and utilizes a regular inductor. Over conventional power supplies, substantial size reduction still results. While the previously disclosed embodiment including the thin film transformer and the thin film inductor remains preferred, the disclosure of the new embodiment (FIG. 4) has been found to be operable and to have utility.

It is to be understood that the experimental circuit disclosed herein is believed to be novel in so far as direct switching of the 60 Hertz input voltage occurs. It is not known to applicant that power supplies having direct switching above 1 KHz and preferably to the MHz range occurs.

Figure 4:
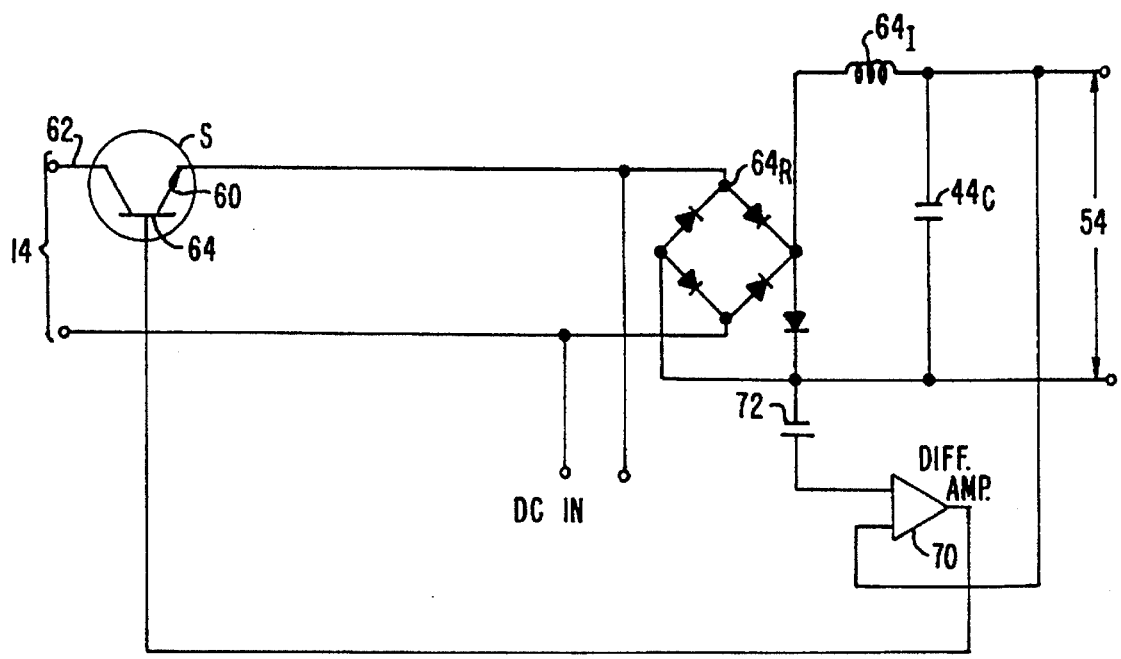
FIG. 4 is a schematic similar to FIG. 3 illustrating operation of an experimental circuit based on this invention.

Referring to FIG. 4, an experimental circuit for the miniaturized power supply of this invention is disclosed. Over the circuit previously described in FIG. 3, the thin film transformer is omitted. A conventional high frequency rectifier $64_R$ is utilized. Additionally a conventional inductance $64_I$ is utilized. In all other aspects, the circuit is the same as that previously illustrated with respect to FIG. 3.

It was found that semiconductor switch S was effective in eliminating the 60 Hertz signal of A.C. input 14 and the circuit was operable without the presence of the thin film transformer.

Since thin film transformers and inductors are not currently commercially available an inductor-capacitor circuit at the output of the switch was utilized to translate the 110 volt power line voltage and provide sufficient filtering to obtain several volts DC suitable for typical applications.

The circuit responded to a conventional regulation circuit as indicated in FIG. 3. This maintained the output voltage at the desired level.

Regarding size, the entire circuit as described fits into a space of 3" by 2" by 1". It is to be noted that this volume is some two or three times smaller than commercially available power supplies, such as those used with so-called "notebook" computers.

A power supply with a thin film transformer and inductor still remains preferred for further size reduction. For example, a typical size of such a thin film transformer in chip form would be ¾" by ¼" by ⅛". This compares with a conventional transformer of 2" by 1½" by 1¼". Thus by the use of a thin film transformer, reduction over a conventional transformer occurs by a factor of 150 times.

EXPERIMENTAL RESULTS

Summary of some experimental results are given below:

(a) Referring to FIG. 3, we have performed an experiment in which we switch the semiconductor switch up to a MHz without the use of a bulky 60 Hz transformer preceding it.

(b) Since thin film transformers are not commercially available, we used an inductor-capacitor circuit at the output of the switch to translate the 110 volt power line voltage and filtered it to obtain several volts d.c. suitable for typical applications.

(c) A regulation circuit as indicated in FIG. 3 was constructed and used to maintain the output d.c. voltage at a desired level.

(d) The entire circuit as described above fits into a space of 3"×2"×1". This volume is some two or three times smaller than commercially available power supplies for similar applications, such as notebook computers.

(e) With a thin film transformer, the volume mentioned in (d) above will be reduced by at least half and the entire circuit can be mounted on a card to be placed inside a notebook computer.

(f) A thin film transformer should be made in chip form. Its size will depend on the power level involved but a typical size might be ¾"×¼"×⅛". This compares with a conventional transformer of 2"×1½"1¼". Thus, a thin film transformer can reduce the volume over a conventional one by some 150 times.

What is claimed is:

1. A rectifier for receiving current having an oscillating component in the range of 50/60 Hertz and out putting direct current comprising in combination:

a direct current driven semiconductor switch connected to said current having an oscillating component in the range of 50/60 Hertz and operative to switch said current having an oscillating component to produce switched current having a frequency exceeding 100 kilohertz;

a high frequency rectifier for producing direct current from the direct current driven semiconductor switch;

a filter circuit for filtering said direct current from said high frequency rectifier to produce a direct current output from said rectifier; and, a regulator to said semiconductor switch having power sufficient to drive said semiconductor switch, said direct current power source to said semiconductor switch having no significant contribution to the switched current output of said semiconductor switch.

2. A rectifier for receiving current having an oscillating component in the range of 50/60 Hertz and out putting direct current according to claim 1 and wherein:

said direct current power source comprises a feedback connection from said direct current output of said power supply.

3. A process for receiving current having an alternating component in the range of 50/60 Hertz and out putting direct current comprising the steps of:

providing a direct current driven semiconductor switch connected to said current having an alternating component in the range of 50/60 Hertz;

switching said current to produce switched current having a frequency exceeding 100 kilohertz and having no direct current input into said switched current;

providing and connecting a high frequency rectifier for producing direct current from said switched current;

providing and connecting a filter circuit for filtering said direct current from said high frequency rectifier to produce a direct current output from said rectifier; and, providing to said semiconductor switch a direct current power source to said semiconductor switch having power sufficient to drive said semiconductor switch, said direct current power source to said semiconductor switch having no significant contribution to the switched current output of said semiconductor switch.

* * * * *